(12) United States Patent
Segawa

(10) Patent No.: US 11,459,907 B2
(45) Date of Patent: Oct. 4, 2022

(54) VARIABLE CAPACITY TURBOCHARGER

(71) Applicant: IHI Corporation, Tokyo (JP)

(72) Inventor: Kenichi Segawa, Tokyo (JP)

(*) Notice: Subject to any disclaimer, the term of this patent is extended or adjusted under 35 U.S.C. 154(b) by 0 days.

(21) Appl. No.: 17/229,865

(22) Filed: Apr. 14, 2021

(65) Prior Publication Data

US 2021/0231028 A1 Jul. 29, 2021

Related U.S. Application Data

(63) Continuation of application No. PCT/JP2019/034273, filed on Aug. 30, 2019.

(30) Foreign Application Priority Data

Oct. 18, 2018 (JP) .............................. JP2018-196723

(51) Int. Cl.
*F01D 17/16* (2006.01)
*F02C 6/12* (2006.01)

(52) U.S. Cl.
CPC .............. *F01D 17/165* (2013.01); *F02C 6/12* (2013.01); *F05D 2220/40* (2013.01); *F05D 2240/128* (2013.01); *F05D 2250/90* (2013.01)

(58) Field of Classification Search
CPC .......... F01D 17/165; F01D 25/16; F02C 6/12; F05D 2220/40; F05D 2240/128; F05D 2250/90; F02B 37/24; F02B 39/00
See application file for complete search history.

(56) References Cited

U.S. PATENT DOCUMENTS

| 11,255,255 B2* | 2/2022 | Cooley ................. F04D 27/009 |
| 11,255,257 B2* | 2/2022 | Uemura ................. F02B 37/24 |
| 2006/0188368 A1* | 8/2006 | Jinnai ................... F01D 17/165 |
| | | 415/191 |
| 2008/0223956 A1 | 9/2008 | Jinnai et al. |

(Continued)

FOREIGN PATENT DOCUMENTS

| CN | 101946069 | 1/2011 |
| CN | 102713198 | 10/2012 |

(Continued)

OTHER PUBLICATIONS

International Search Report dated Nov. 5, 2019 for PCT/JP2019/034273.

(Continued)

*Primary Examiner* — Aaron R Eastman
(74) *Attorney, Agent, or Firm* — Soei Patent & Law Firm

(57) ABSTRACT

A variable capacity turbocharger may include a turbine housing, a variable capacity mechanism, and a cover. The turbine housing may include a scroll flow path, a cylindrical portion having a shroud surface facing blades of a turbine impeller, and an exhaust gas outlet flow path. The variable capacity mechanism may be attached to the turbine housing and may include a first plate and a second plate facing each other, and a plurality of variable nozzle vanes disposed between the first plate and the second plate. The cover may be disposed outside the cylindrical portion in a radial direction to face the second plate in an axial direction and to form a part of the scroll flow path. The cover may be attached to the turbine housing such that a gap is formed between the cover and the second plate.

20 Claims, 7 Drawing Sheets

(56) References Cited

U.S. PATENT DOCUMENTS

| | | | |
|---|---|---|---|
| 2010/0310365 A1 | 12/2010 | Matsuyama et al. | |
| 2011/0182722 A1* | 7/2011 | Matsuyama | F01D 11/005 277/500 |
| 2012/0263585 A1* | 10/2012 | Matsuyama | F02B 37/00 415/204 |
| 2013/0149129 A1* | 6/2013 | Matsuyama | F01D 17/165 415/208.1 |
| 2015/0260288 A1 | 9/2015 | Matsuyama | |
| 2017/0298813 A1* | 10/2017 | Ikeda | F01D 11/003 |
| 2018/0030848 A1 | 2/2018 | Kobayashi et al. | |
| 2018/0156061 A1 | 6/2018 | Asakawa et al. | |

FOREIGN PATENT DOCUMENTS

| | | |
|---|---|---|
| CN | 102762838 | 10/2012 |
| CN | 106715863 | 5/2017 |
| CN | 107208546 | 9/2017 |
| JP | S59-094127 | 6/1984 |
| JP | 2008-215083 | 9/2008 |
| JP | 2009-197633 | 9/2009 |
| JP | 2010-112195 | 5/2010 |
| JP | 2011-157841 | 8/2011 |
| JP | 2013-002293 | 1/2013 |
| JP | 2013-194546 | 9/2013 |
| JP | 2017-145770 | 8/2017 |
| JP | 2017-180093 | 10/2017 |
| JP | 2018-025125 | 2/2018 |
| WO | 2009/104232 | 8/2009 |
| WO | 2011/093075 | 8/2011 |
| WO | 2011/105090 | 9/2011 |
| WO | 2016/052231 | 4/2016 |
| WO | 2016/159004 | 10/2016 |
| WO | 2016/199600 | 12/2016 |

OTHER PUBLICATIONS

International Preliminary Report on Patentability with Written Opinion dated Apr. 29, 2021 for PCT/JP2019/034273.

* cited by examiner

VARIABLE CAPACITY TURBOCHARGER

CROSS-REFERENCE TO RELATED APPLICATIONS

This application is a continuation application of PCT Application No. PCT/JP2019/034273, filed on Aug. 30, 2019, which claims the benefit of priority from Japanese Patent Application No. 2018-196723, filed Oct. 18, 2018, the entire contents of which are incorporated herein by reference.

BACKGROUND

International Publication WO 2016/199600 describes a turbine of a turbocharger which includes a variable nozzle unit. A plurality of movable nozzle vanes (variable nozzle vanes) are provided in a gas flow path that connects a scroll flow path and a turbine impeller. The plurality of nozzle vanes rotate to adjust the cross-sectional area of the gas flow path. The variable nozzle unit includes a first nozzle ring and a second nozzle ring. The plurality of nozzle vanes are disposed between the first and second nozzle rings. The second nozzle ring faces the scroll flow path, and the second nozzle ring forms a part of an inner wall of the scroll flow path.

Japanese Unexamined Patent Publication No. 2017-145770 describes a turbocharger which has a shielding plate disposed between a second nozzle plate of a variable nozzle mechanism and a scroll chamber. An outer peripheral portion of the shielding plate is in contact with a step portion of a flange portion of the second nozzle plate. Japanese Unexamined Patent Publication No. 2008-215083 describes a turbocharger which has an insert shroud forming a part of an inner surface of a scroll and attached to an inner peripheral portion of a turbine casing. A nozzle plate of a variable nozzle mechanism is supported inside the insert shroud. Japanese Unexamined Patent Publication No. 2017-180093 describes a turbocharger which has a nozzle plate main body of a nozzle mechanism provided between a first intermediate plate and a second intermediate plate. A first nozzle space is formed between the nozzle plate main body and the first intermediate plate, and a second nozzle space is formed between the nozzle plate main body and the second intermediate plate.

SUMMARY

In the turbocharger described in International Publication WO 2016/199600, a structure where a turbine housing includes a wall portion covering a side surface of the second nozzle ring facing the scroll flow path may be considered. In the structure, the wall portion which is a part of the turbine housing may face the second nozzle ring in an axial direction. The wall portion may protrude into the scroll flow path in a radial direction to form a part of the inner wall of the scroll flow path.

A core for forming such a turbine housing (scroll flow path) may have a complicated shape due to the wall portion. Therefore, an undercut or a placed core may be required when the core is produced. This can lead to an increase in production cost.

The present disclosure describes a variable capacity turbocharger capable of simplifying the shape of a core for forming a turbine housing.

An example variable capacity turbocharger may include: a turbine impeller including a plurality of blades; a turbine housing that accommodates the turbine impeller and includes a scroll flow path, a cylindrical portion having a shroud surface facing the blades of the turbine impeller, and an exhaust gas outlet flow path; a variable capacity mechanism that is attached to the turbine housing and includes a first plate and a second plate facing each other, and a plurality of variable nozzle vanes disposed between the first plate and the second plate, in which the second plate is disposed closer to the exhaust gas outlet flow path than the first plate; and a cover member that may be disposed outside the cylindrical portion in a radial direction to face the second plate in an axial direction and to form a part of the scroll flow path, and may include an inner peripheral end disposed along the cylindrical portion of the turbine housing and an outer peripheral end disposed in the scroll flow path. The cover member may be attached to the turbine housing such that a gap may be formed between the cover member and the second plate.

DETAILED DESCRIPTION

Figure 1:
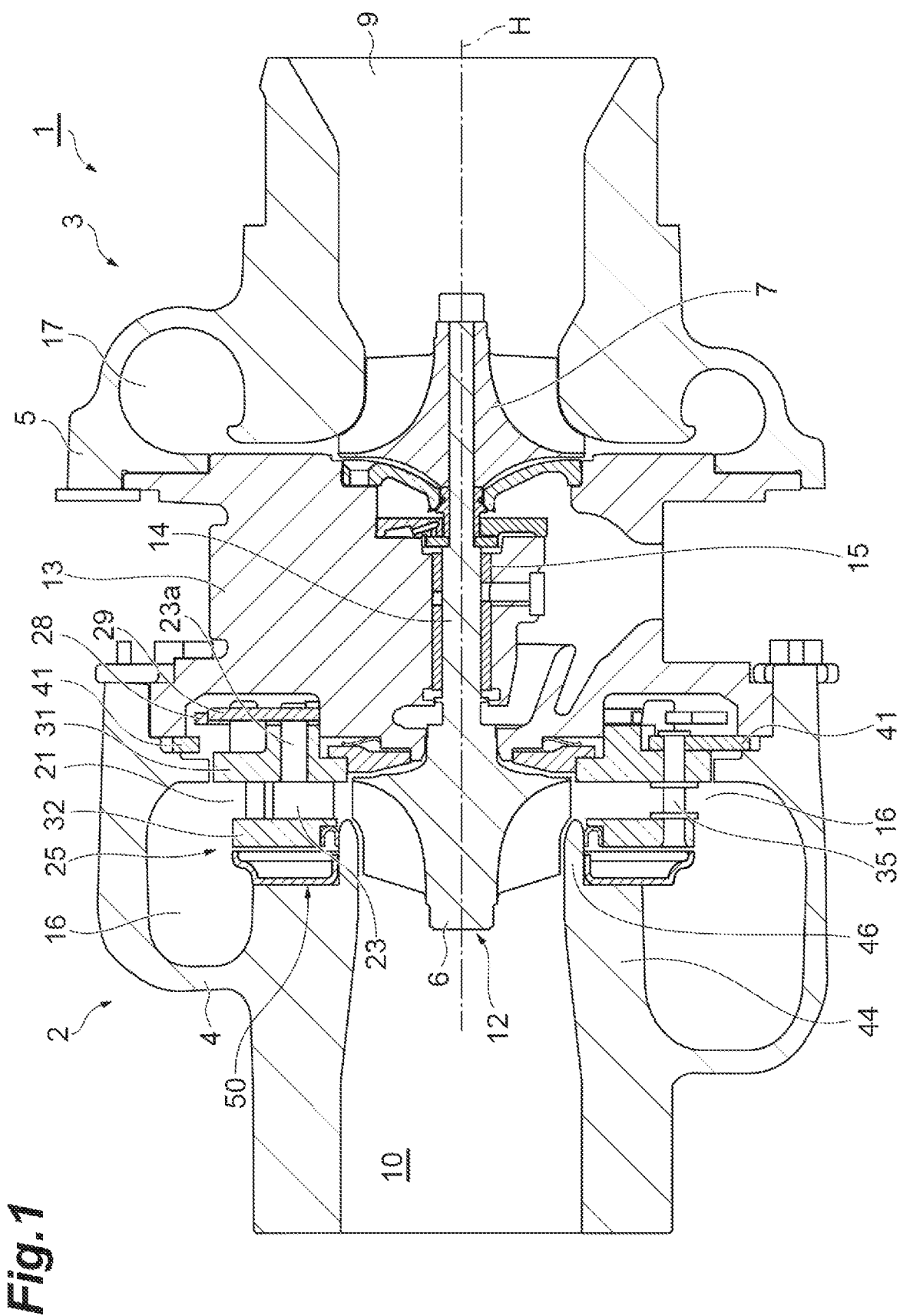
FIG. 1 is a cross-sectional view of an example variable capacity turbocharger.

An example variable capacity turbocharger may include: a turbine impeller including a plurality of blades; a turbine housing that accommodates the turbine impeller and includes a scroll flow path, a cylindrical portion having a shroud surface facing the blades of the turbine impeller, and an exhaust gas outlet flow path; a variable capacity mechanism that is attached to the turbine housing and includes a first plate and a second plate facing each other, and a plurality of variable nozzle vanes disposed between the first plate and the second plate, in which the second plate is disposed closer to the exhaust gas outlet flow path than the first plate; and a cover member that may be disposed outside the cylindrical portion in a radial direction to face the second plate in an axial direction and to form a part of the scroll flow path, and may include an inner peripheral end disposed along the cylindrical portion of the turbine housing and an outer peripheral end disposed in the scroll flow path. The cover member may be attached to the turbine housing such that a gap may be formed between the cover member and the second plate.

In the example variable capacity turbocharger, the cover member attached to the turbine housing faces the second plate in the axial direction. The cover member may form a part of the scroll flow path. In some examples, the cover member may form a first part of the scroll flow path. Since the part of the scroll flow path may be formed as a member separate from the turbine housing, the shape of the turbine housing can be simplified. In particular, the cylindrical portion having the shroud surface may not project outward in the radial direction, and may not include a wall portion as in the turbine housing described in International Publication WO 2016/199600. Therefore, the shape of a core for forming the turbine housing (scroll flow path) can be simplified. An undercut or a placed core may not be required when the core is produced. The structure where a part (portion having a complicated shape) of the turbine housing is replaced with the cover member may suppress an increase in production cost.

The gap may be formed between the cover member and the second plate. In the structure, the gap may be fluidly coupled with the scroll flow path. Therefore, not only a high pressure may be applied only to a scroll flow path side of the cover member, but also some pressure may be applied to a second plate side thereof. As a result, pressure equilibrium (pressure balance) may be maintained between both sides in the axial direction of the cover member.

In some examples, a diameter of the outer peripheral end of the cover member may be equal to a diameter of the second plate or may be larger than the diameter of the second plate. In this case, the cover member can completely cover the second plate.

In some examples, the turbine housing may include a tubular portion that is formed to be continuous with the cylindrical portion in the axial direction to form another part (e.g., a second part) of the scroll flow path on an outer peripheral side and to form the exhaust gas outlet flow path downstream of the turbine impeller on an inner peripheral side, and the tubular portion may include a step surface that has an annular shape and is formed to face the second plate. The cover member may include a base surface that has an annular shape and extends between the inner peripheral end and the outer peripheral end to form a first end surface in the axial direction and to be in contact with the step surface of the tubular portion. In this case, the base surface may be formed in the first end surface in the axial direction of the cover member, and the base surface may be in contact with the step surface of the turbine housing. The base surface may be provided as a seating surface, so that the attachment state (posture) of the cover member is stable.

In some examples, a second end surface of the cover member may be open toward the second plate, the second end surface being located opposite the base surface in the axial direction. In this case, the cover member can be reduced in weight. Namely, the cover member having a cup shape of which the inside may be hollow and the second end surface may be open contributes to a reduction in overall weight of the turbocharger.

In some examples, the cover member may include the base surface having a smaller outer diameter than a diameter of the outer peripheral end of the cover member, and an inclined surface portion that is formed between the outer peripheral end and the base surface to face the scroll flow path. In this case, since the cover member may include the base surface as a seating surface and the inclined surface portion facing the scroll flow path, the shape of the scroll flow path can be arbitrarily adjusted.

In some examples, the outer diameter of the base surface of the cover member may be constant in a circumferential direction, and may be equal to a diameter of an outer periphery of the step surface of the tubular portion of the turbine housing in at least a portion in the circumferential direction. The inclined surface portion may be smoothly continuous with a first outer peripheral surface of the tubular portion in at least the portion in the circumferential direction, the first outer peripheral surface forming the other part of the scroll flow path. In this case, since the cover member may have a symmetrical shape, the cover member can be easily produced. In addition, since there may be no step between the turbine housing and the cover member in a portion in the circumferential direction, gas can flow smoothly.

In some examples, the outer diameter of the base surface of the cover member may change in a circumferential direction, and may be equal to a diameter of an outer periphery of the step surface of the tubular portion of the turbine housing in substantially an entire region in the circumferential direction. The inclined surface portion may be smoothly continuous with an outer peripheral surface of the tubular portion in substantially the entire region in the circumferential direction, the outer peripheral surface forming the other part of the scroll flow path. In this case, since there may be no step between the turbine housing and the cover member in substantially the entire region in the circumferential direction, the gas can flow smoothly.

In some examples, the cover member may include an inner tubular portion that is formed along the cylindrical portion of the turbine housing and has the inner peripheral end, and the inner tubular portion is fitted to a second outer peripheral surface of the cylindrical portion, so that the cover member is attached to the turbine housing. In this case, the attachment state (posture) of the cover member may be further stable.

In the following description, with reference to the drawings, the same reference numbers are assigned to the same components or to similar components having the same function, and overlapping description is omitted.

An example variable capacity turbocharger 1 illustrated in FIG. 1 may be applied to, for example, an internal combustion engine of a ship or a vehicle. As illustrated in FIG. 1, the variable capacity turbocharger 1 may include a turbine 2 and a compressor 3. The turbine 2 may include a turbine housing 4 and a turbine impeller 6 accommodated in the turbine housing 4. The turbine housing 4 may include a scroll flow path 16 extending in a circumferential direction around the turbine impeller 6. The compressor 3 may include a compressor housing 5 and a compressor impeller 7 accommodated in the compressor housing 5. The compressor housing 5 may include a scroll flow path 17 extending in the circumferential direction around the compressor impeller 7.

The turbine impeller 6 may be provided at a first end of a rotary shaft 14, and the compressor impeller 7 may be provided at a second end of the rotary shaft 14. A bearing housing 13 may be provided between the turbine housing 4 and the compressor housing 5. The rotary shaft 14 may be rotatably supported via a bearing 15 by the bearing housing 13, and the rotary shaft 14, the turbine impeller 6, and the compressor impeller 7 can integrally rotate around a rotary axis H as a rotating body 12.

The turbine housing 4 may be provided with an exhaust gas inlet port 8 (refer to FIG. 3) and an exhaust gas outlet flow path 10. Exhaust gas discharged from an internal combustion engine (unillustrated) may flow into the turbine housing 4 through the exhaust gas inlet port, and then flow into the turbine impeller 6 through the scroll flow path 16 to rotate the turbine impeller 6. Thereafter, the exhaust gas may flow outside the turbine housing 4 through the exhaust gas outlet flow path 10.

The compressor housing 5 may be provided with a suction port 9 and a discharge port (unillustrated). When the turbine impeller 6 rotates, the compressor impeller 7 may rotate via the rotary shaft 14. The compressor impeller 7 rotating suctions outside air through the suction port 9, may compress the suctioned outside air, and then discharge the suctioned outside air from the discharge port through the scroll flow path 17. The compressed air discharged from the discharge port may be supplied to the internal combustion engine.

The turbine 2 will be described in further detail. The turbine 2 may be a variable capacity turbine, and a plurality of variable nozzle vanes 23 may be provided in a gas inlet path 21 that connects the scroll flow path 16 and the turbine impeller 6. The plurality of variable nozzle vanes 23 may be disposed on a circumference centered on the rotary axis H, and the variable nozzle vanes 23 each rotate around a rotary axis parallel to the rotary axis H. Gas flowing into the turbine impeller 6 from the scroll flow path 16 may pass through the gas inlet path 21. The variable nozzle vanes 23 may rotate, so that the cross-sectional area (throat area) of the gas flow path is optimally adjusted according to the flow rate of the exhaust gas introduced into the turbine 2.

The turbine 2 may include a variable nozzle unit (variable capacity mechanism) 25 as a drive mechanism that causes the variable nozzle vanes 23 to rotate. The variable nozzle unit 25 may be disposed between the turbine housing 4 and the bearing housing 13 joined to the turbine housing 4. The variable nozzle unit 25 may be attached to the turbine housing 4. For example, the variable nozzle unit 25 may be interposed and fixed between the turbine housing 4 and the bearing housing 13.

The variable nozzle unit 25 will be described. An "axial direction D1" or an "axis direction D1", a "radial direction D2", the "circumferential direction D3", and the like simply referred to in the following description mean a rotary axis H direction of the turbine impeller 6, and a radial direction and a circumferential direction with respect to the rotary axis H, respectively. In addition, in the rotary axis H direction, a side close to the turbine 2 may be simply referred to as a "turbine side", and a side close to the compressor 3 may be simply referred to as a "compressor side".

The variable nozzle unit 25 may include a first nozzle ring (first plate) 31 and a second nozzle ring (second plate) 32 facing each other, and the plurality of variable nozzle vanes 23 disposed between the first nozzle ring 31 and the second nozzle ring 32. The first nozzle ring 31 and the second nozzle ring 32 each has an annular shape centered on the rotary axis H, and may be disposed to surround the turbine impeller 6. Namely, the first nozzle ring 31 and the second nozzle ring 32 may be disposed around the rotary axis H. A region interposed between the first nozzle ring 31 and the second nozzle ring 32 may form the gas inlet path 21. The second nozzle ring 32 may be disposed closer to the exhaust gas outlet flow path 10 than the first nozzle ring 31. In other words, the second nozzle ring 32 may be disposed farther from the bearing housing 13 than the first nozzle ring 31. A rotary shaft 23a of each of the variable nozzle vanes 23 may be rotatably inserted into a bearing hole of the first nozzle ring 31. The first nozzle ring 31 may support, for example, each of the variable nozzle vanes 23 in a cantilever manner.

A support ring 41 having an annular plate shape may be fixed to a compressor side (side opposite the variable nozzle unit 25) of the first nozzle ring 31, and a drive ring support member (unillustrated) having a ring shape may be fixed to a compressor side of the support ring 41. The first nozzle ring 31, the second nozzle ring 32, the support ring 41, and the drive ring support member 43 each are provided with a plurality (for example, three) of pin holes. The pin holes may be arranged in a row and connection pins 35 may be inserted into the pin holes, so that the first nozzle ring 31, the second nozzle ring 32, the support ring 41, and the drive ring support member 43 are connected to each other.

The support ring 41 and the drive ring support member 43 may be caulked together to the first nozzle ring 31 by compressor side portions of the connection pins 35. In addition, a turbine side portion of the connection pin 35 may be provided with two flange portions for positioning of the first nozzle ring 31 and the second nozzle ring 32. The dimension between the two flange portions may be produced with high accuracy, so that the accuracy of the dimension in the axis direction D1 of the gas inlet path 21 is secured. A drive ring 28 may be attached to the drive ring support member 43, so that the drive ring 28 is supported so as to be rotatable around the rotary axis H.

The drive ring 28 may be a member that transmits a driving force to the variable nozzle vanes 23, the driving force being input from outside, and is made of, for example, a metal material as a single member. The drive ring 28 may have a ring shape extending on a circumference centered on the rotary axis H, and receive a driving force from outside to rotate around the rotary axis H. Levers 29 may be attached to the rotary shafts 23a of the variable nozzle vanes 23, respectively, and disposed at equal intervals on a circumference inside the drive ring 28.

A portion of the variable nozzle unit 25 may be fixed to the turbine housing 4, the portion including the first nozzle ring 31, the second nozzle ring 32, the support ring 41, and the connection pins 35, to rotatably support the plurality of variable nozzle vanes 23.

Figure 2:
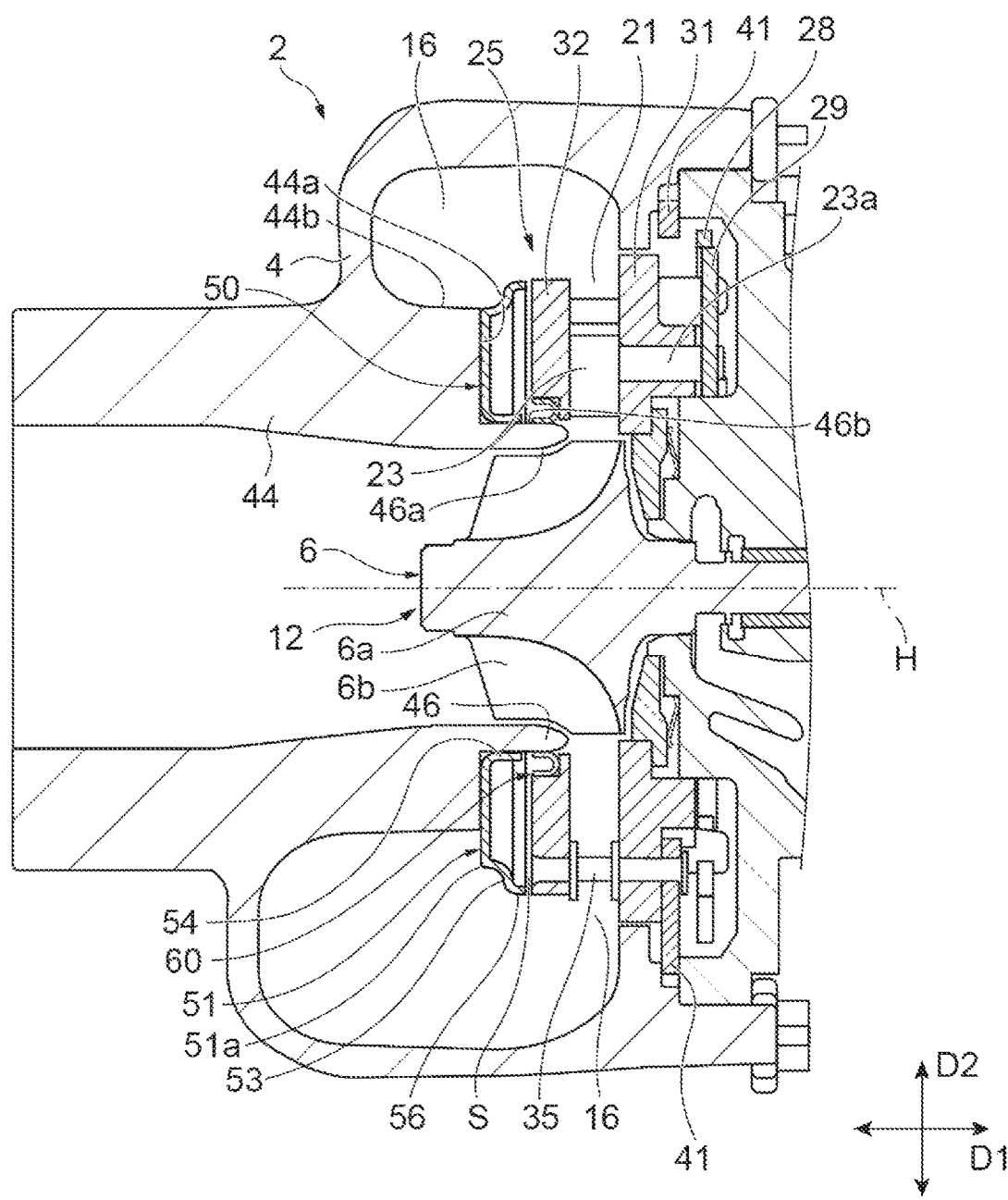
FIG. 2 is a partial enlarged view of FIG. 1.

The variable nozzle unit 25, the turbine housing 4, and the structure therearound will be described with reference to FIGS. 1 and 2. As illustrated in FIG. 2, the turbine impeller 6 may include a hub 6a attached to the first end of the rotary shaft 14, and a plurality of blades 6b formed to protrude from above the hub 6a. The plurality of blades 6b may have, for example, the same shape and size, and are disposed at equal intervals in the circumferential direction D3.

As illustrated in FIGS. 1 and 2, the turbine housing 4 may include a cylindrical portion 46 having a shroud surface 46a facing the plurality of blades 6b of the turbine impeller 6, and a tubular portion 44 formed to be continuous with the cylindrical portion 46 in the axial direction D1. The tubular portion 44 may be formed on an opposite side of the cylindrical portion 46 from the variable nozzle unit 25 (side opposite the compressor 3). Namely, the cylindrical portion 46 may be disposed closer to the first nozzle ring 31 than the tubular portion 44.

The tubular portion 44 may form the exhaust gas outlet flow path 10 downstream of the turbine impeller 6 on an inner peripheral side of the tubular portion 44. The tubular portion 44 may include a first outer peripheral surface 44b on an outer peripheral side thereof. The first outer peripheral surface 44b may form a part of the scroll flow path 16 (another part formed by the turbine housing 4). The cylindrical portion 46 may include the shroud surface 46a on an inner peripheral side thereof, and may include a second outer peripheral surface 46b on an outer peripheral side thereof. The second outer peripheral surface 46b may face an inner tubular portion 52 of a cover member 50 and an inner peripheral surface of the second nozzle ring 32 in the radial direction D2. The thickness in the radial direction D2 of the tubular portion 44 may be larger than the thickness in the radial direction D2 of the cylindrical portion 46 in the most portion in the circumferential direction D3.

In the present example, the cylindrical portion 46 may not include a portion protruding in the radial direction D2. The second outer peripheral surface 46b of the cylindrical portion 46 is, for example, a cylindrical surface having a constant diameter. Alternatively, the second outer peripheral surface 46b of the cylindrical portion 46 may be reduced in diameter as approaching a tip thereof (namely, approaching the compressor 3).

The variable capacity turbocharger 1 may include the cover member 50 that may have a disk shape and may be disposed outside the cylindrical portion 46 in the radial direction D2 to form a part of the scroll flow path 16. The cover member 50 may be separate from the turbine housing 4. The cover member 50 may be made of, for example, metal. The cover member 50 may be made of, for example, stainless steel (for example, SUS316 or the like). The cover member 50 may have heat resistance to, for example, the temperature (as one example, 850 to 980° C.) of the exhaust gas. The cover member 50 may have corrosion resistance to, for example, the compositions of the exhaust gas. The cover member 50 may be made of a material different from that of the turbine housing 4. The cover member 50 may be formed, for example, by known sheet metal working. The cover member 50 may be formed, for example, by pressing, drawing or the like.

The cover member 50 may face the second nozzle ring 32 in the axial direction D1. The cover member 50 may cover a side surface of the second nozzle ring 32 (side surface located opposite a side surface facing the first nozzle ring 31). The diameter of the cover member 50 may be substantially equal to the diameter of the second nozzle ring 32. More specifically, the cover member 50 having a donut shape may include an inner peripheral end 54 disposed along the cylindrical portion 46 of the turbine housing 4, and an outer peripheral end 56 disposed in the scroll flow path 16. For example, the diameter of the outer peripheral end 56 of the cover member 50 may be constant. The diameter of the outer peripheral end 56 of the cover member 50 may be equal to the diameter of the second nozzle ring 32.

Figure 7:
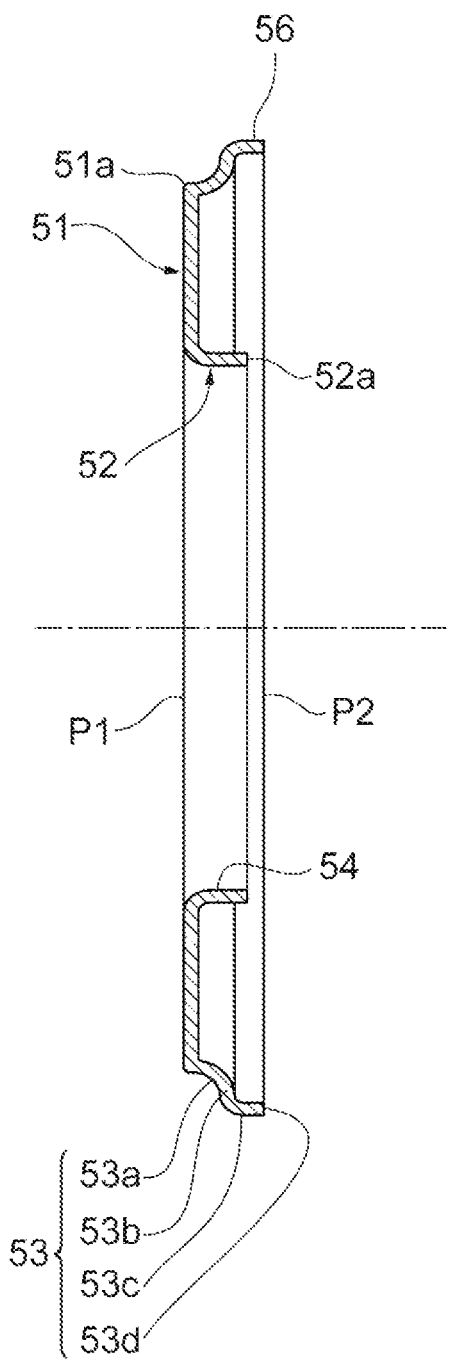
FIG. 7 is a cross-sectional view along line VII-VII of FIG. 6.

The cover member 50 may include a first end surface P1 and a second end surface P2 in the axial direction (refer to FIG. 7). The first end surface P1 may face the tubular portion 44 of the turbine housing 4, and the second end surface P2 faces the second nozzle ring 32. The cover member 50 may include a base surface 51 that extends between the inner peripheral end 54 and the outer peripheral end 56 to form the first end surface P1. The base surface 51 may have, for example, an annular shape having a flat surface orthogonal to the rotary axis H. The base surface 51 of the cover member 50 may have a smaller outer diameter than the diameter of the outer peripheral end 56. As illustrated in FIG. 2 and FIGS. 4 to 7, the cover member 50 may include an inclined surface portion 53 that is formed between the outer peripheral end 56 and the base surface 51 to face the scroll flow path 16. The cover member 50 may further include the inner tubular portion 52 that is formed along the cylindrical portion 46 of the turbine housing 4 and has the inner peripheral end 54. The inner tubular portion 52 may have a cylindrical shape having a constant inner diameter. Then, the inner tubular portion 52 of the cover member 50 may be fitted to the second outer peripheral surface 46b of the cylindrical portion 46 of the turbine housing 4, so that the cover member 50 is attached to the turbine housing 4. The cover member 50 may be attached to the turbine housing 4, for example, by press fitting.

The tubular portion 44 of the turbine housing 4 may include a step surface 44a that has an annular shape and is formed to face the second nozzle ring 32. The step surface 44a may have, for example, a flat annular shape orthogonal to the rotary axis H. The base surface 51 of the cover member 50 may be in contact with the step surface 44a of the tubular portion 44. For example, the base surface 51 which is flat may be in plane contact with the step surface 44a. Accordingly, the position of the cover member 50 may be determined.

Figure 5:
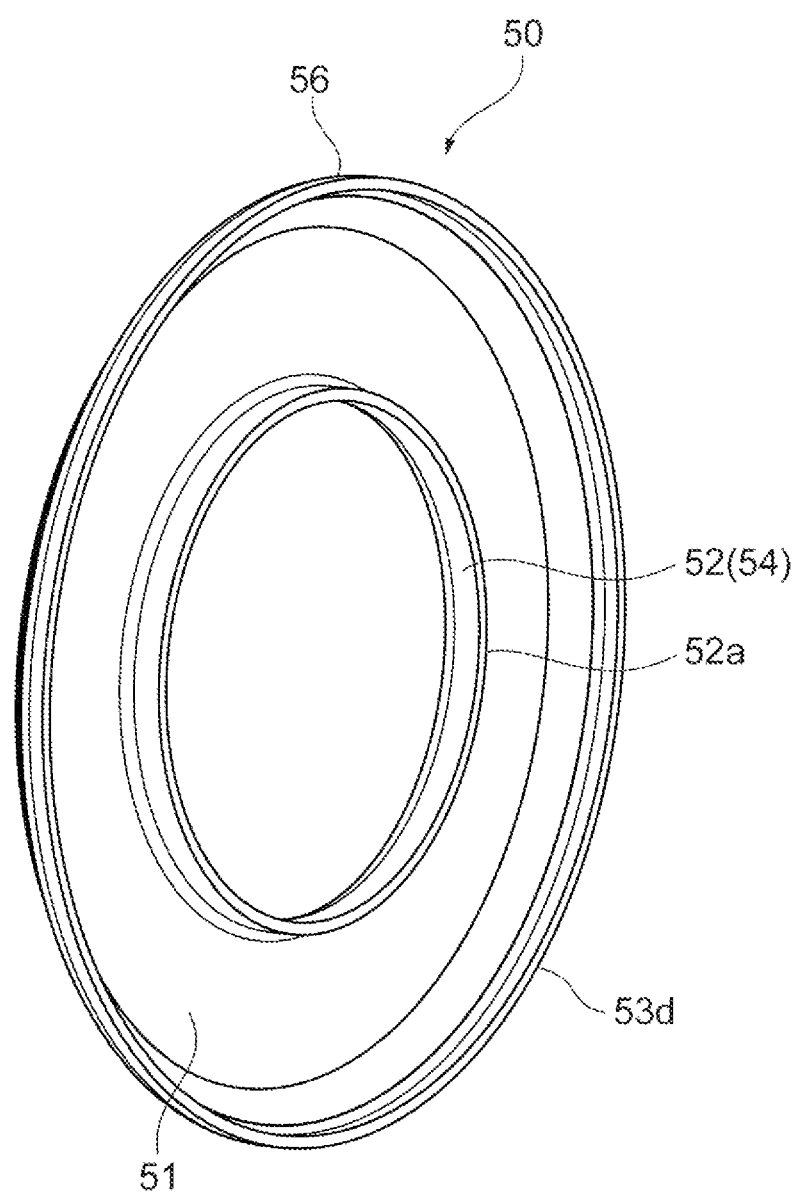
FIG. 5 is a perspective view illustrating the cover member when seen from a second end surface side.
Figure 6:
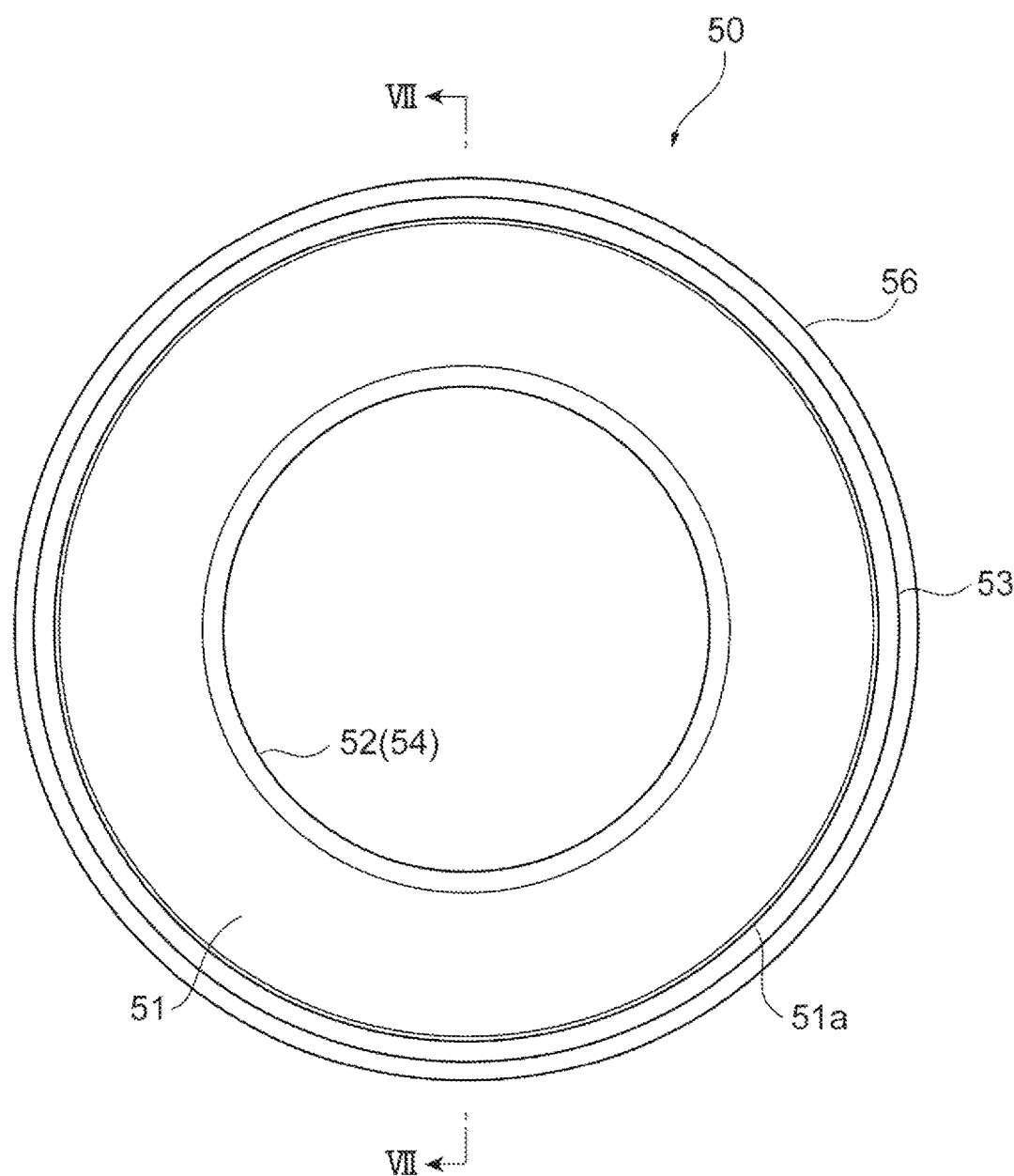
FIG. 6 is a front view of the cover member.

As illustrated in FIGS. 2, 5, and 7, the second end surface P2 which is located opposite the base surface 51 of the cover member 50 in the axial direction may be open toward the second nozzle ring 32. In other words, the cover member 50 may have a cup shape that is open toward the second nozzle ring 32. The cover member 50 may contribute to a reduction in weight of the turbine housing 4 while forming a part of the scroll flow path 16. Since the cover member 50 may be also reduced in weight, the cover member 50 may contribute to a reduction in overall weight of the variable capacity turbocharger 1.

The cover member 50 may not be in contact with the second nozzle ring 32 of the variable nozzle unit 25. In other words, the cover member 50 may be spaced apart from the variable nozzle unit 25 in the axial direction D1. More specifically, as illustrated in FIG. 2, the cover member 50 may be attached to the turbine housing 4 such that a gap S is formed between the cover member 50 and the second nozzle ring 32. For example, the gap S, namely, a space having a constant thickness in the axial direction D1 may be formed between the second end surface P2 of the cover member 50, the second end surface P2 being open, and the second nozzle ring 32 facing the second end surface P2 in the axial direction D1. The cover member 50 may allow the exhaust gas, which flows through the scroll flow path 16, to flow into the gap S (however, the gap S is not a flow path of the exhaust gas).

Figure 3:
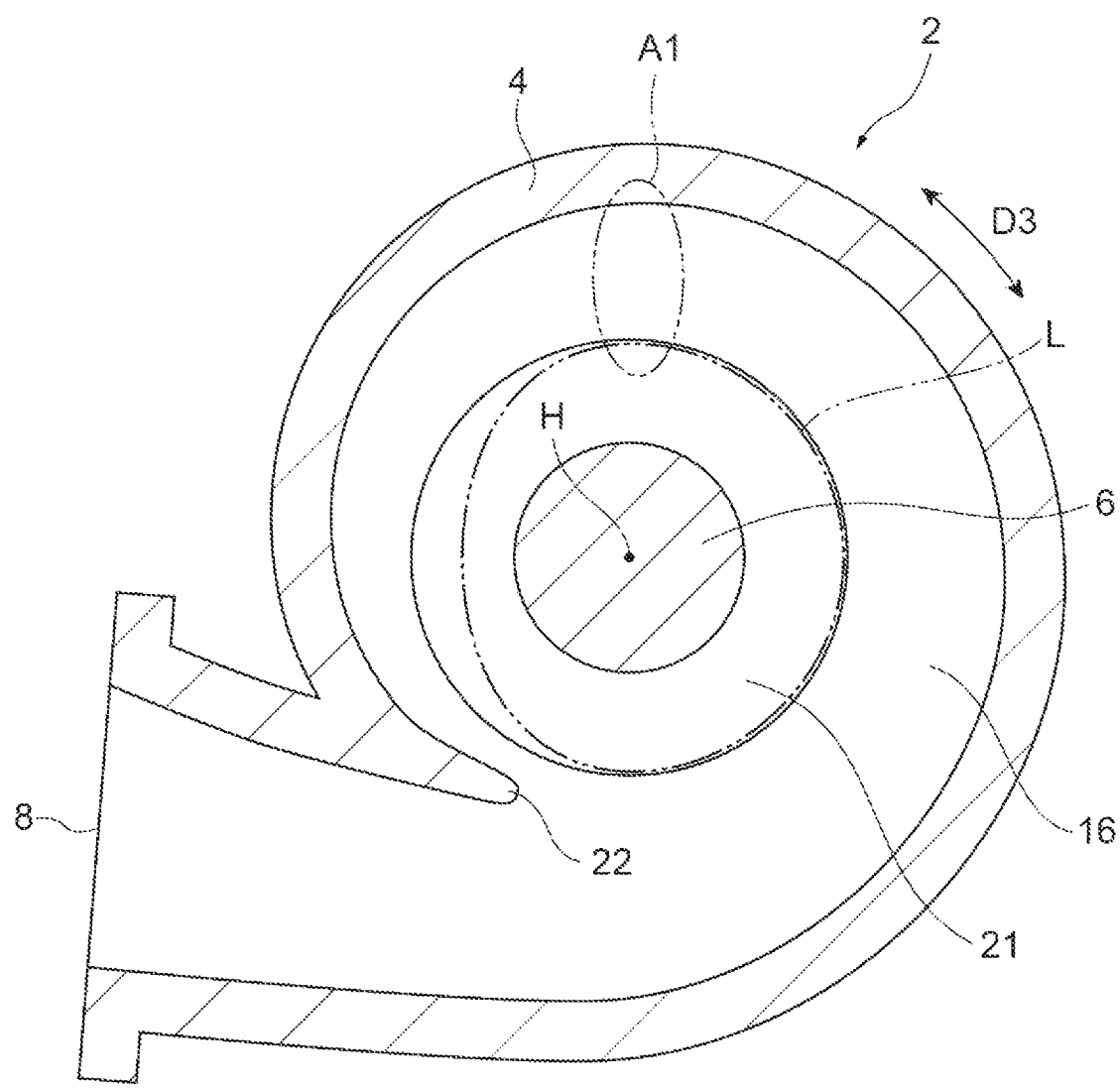
FIG. 3 is a cross-sectional view of an example turbine of the variable capacity turbocharger of FIG. 1 which is cut perpendicular to an axis, and is a view schematically illustrating the shape of a scroll flow path.
Figure 4:
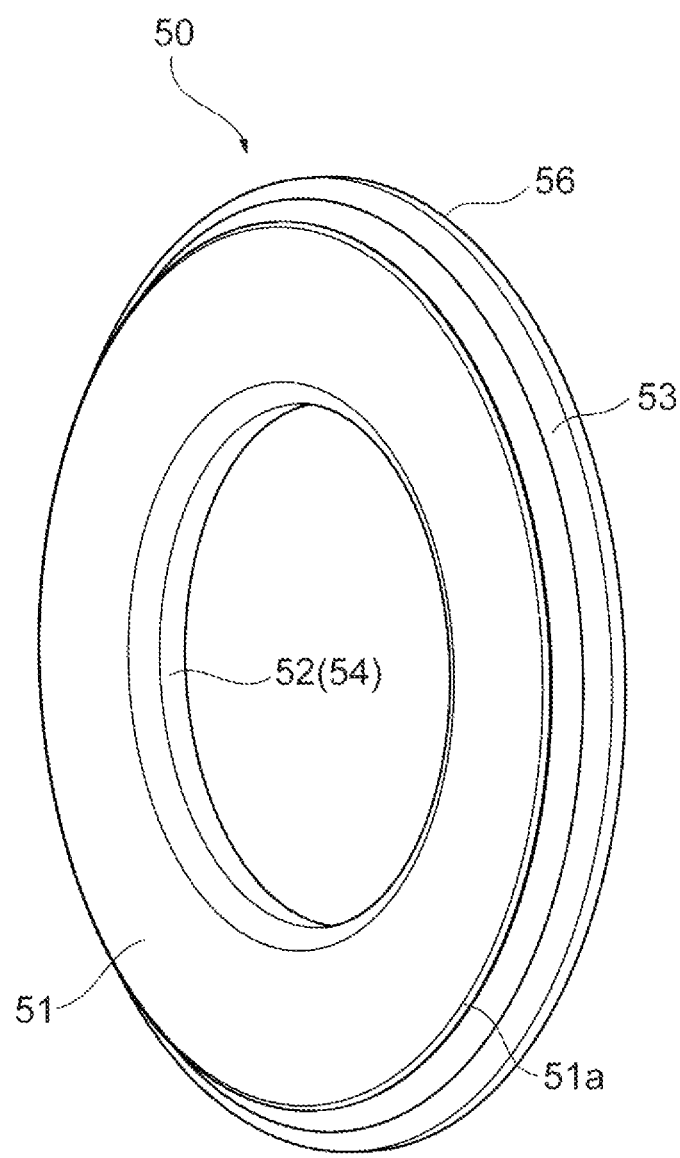
FIG. 4 is a perspective view illustrating an example cover member when seen from a base surface (first end surface) side.

Further specifically, as illustrated in FIGS. 2, 4, and 7, the outer diameter of the base surface 51 of the cover member 50 (position of an outer peripheral edge 51a) may be constant in the circumferential direction D3, and be equal to that of an outer periphery of the step surface 44a of the tubular portion 44 of the turbine housing 4 in at least a portion in the circumferential direction D3. The inclined surface portion 53 may be smoothly continuous with the first outer peripheral surface 44b of the tubular portion 44 without a step in the portion in the circumferential direction D3, the first outer peripheral surface 44b forming a part of the scroll flow path 16 (another part formed by the turbine housing 4). For example, the positional relationship and the size are illustrated by the outer peripheral edge 51a and the inclined surface portion 53 above the rotary axis H between a pair of the upper and lower outer peripheral edges 51a and inclined surface portions 53 illustrated in FIG. 2. For example, as illustrated in FIG. 3, in a portion A1 that is opposite to the position of formation of a tongue portion 22 with respect to the rotary axis H, the position of the outer peripheral edge 51a of the base surface 51 may be aligned with the first outer peripheral surface 44b of the tubular portion 44. Note that, at the position of formation of the tongue portion 22, the position of the outer peripheral edge 51a of the base surface 51 may be aligned with the first outer peripheral surface 44b of the tubular portion 44. At another or a plurality of positions in the circumferential direction D3 which are different from the above positions, the position of the outer peripheral edge 51a of the base surface 51 may be aligned with the first outer peripheral surface 44b of the tubular portion 44. In addition, the outer peripheral edge 51a of the base surface 51 may be formed along a non-circular shape (asymmetrical shape) L as illustrated by a virtual line in FIG. 3.

As illustrated in FIG. 7, the inclined surface portion 53 may include a depression 53a connected to the outer peripheral edge 51a of the base surface 51, and a protrusion 53c connected to an outer periphery of the inclined surface portion 53. The inclined surface portion 53 may have an inflection point 53b between the depression 53a and the protrusion 53c. An end surface 53d of the inclined surface portion 53 may protrude to be closer to the second nozzle ring 32 than an end surface 52a of the inner tubular portion 52. In other words, the end surface 52a of the inner tubular portion 52 may be retracted toward the inside of the cover member 50 from the end surface 53d of the inclined surface portion 53. The end surface 53d having an annular shape of the inclined surface portion 53 may be formed to be located on one virtual plane. The virtual plane corresponds to the second end surface P2, and is parallel to, for example, the side surface of the second nozzle ring 32 (side surface located opposite the side surface facing the first nozzle ring 31).

As illustrated in FIG. 2, for example, a seal member 60 having a C shape may be attached between the inner peripheral surface of the second nozzle ring 32 and the second outer peripheral surface 46b of the cylindrical portion 46. The seal member 60 may have a shape that is open toward the gap S in the axial direction D1. The seal member 60 may apply a biasing force in the radial direction D2 to the cylindrical portion 46 and the second nozzle ring 32.

When the variable capacity turbocharger 1 is assembled, first, the cover member 50 may be attached to the turbine housing 4. The variable nozzle unit 25 to which the seal member 60 is fitted may be attached to the turbine housing 4 and the cover member 50 that are integrated.

In the variable capacity turbocharger 1, the cover member 50 attached to the turbine housing 4 may face the second nozzle ring 32 in the axial direction D1. The cover member 50 may form a part of the scroll flow path 16. Since the part of the scroll flow path 16 may be formed as a member separate from the turbine housing 4, the shape of the turbine housing 4 can be simplified. In particular, the cylindrical portion 46 having the shroud surface 46a may not project outward in the radial direction D2, and may not include a wall portion as in the turbine housing described in International Publication WO 2016/199600 discussed above. Therefore, the shape of a core for forming the turbine housing 4 (scroll flow path 16) can be simplified. An undercut or a placed core may not be required when the core is produced. The structure where a part (portion having a complicated shape) of the turbine housing 4 may be replaced with the cover member 50 suppresses an increase in production cost. In addition, the gap S may be formed between the cover member 50 and the second nozzle ring 32. In the structure, the gap S may be fluidly coupled with the scroll flow path 16. Therefore, not only a high pressure is applied only to a scroll flow path 16 side of the cover member 50, but also some pressure can be applied to a second nozzle ring 32 side thereof. As a result, pressure equilibrium (pressure balance) can be maintained between both sides in the axial direction D1 of the cover member 50. In addition, it may not be necessary to specially design the turbine housing 4 according to the outer diameter of the second nozzle ring 32. It may not be necessary to prepare a plurality of material molds, and it may be only necessary to adjust the shape of the cover member 50.

Since the diameter of the outer peripheral end 56 of the cover member 50 may be equal to the diameter of the second nozzle ring 32, the cover member 50 can completely cover the second nozzle ring 32. It would be desirable that the second nozzle ring 32 is made of sheet metal (press). However, the degree of freedom in shape tends to decrease in the press. In terms of fluid performance, the higher the degree of freedom in shape is, the less loss the shape can be designed with Therefore, the entire surface of the second nozzle ring 32 may be covered with a thin plate cover having a higher degree of freedom in shape than that of a thick plate press cover, so that the scroll flow path with a small loss can be designed.

The base surface 51 may be formed in the first end surface P1 in the axial direction of the cover member 50, and the base surface 51 may be in contact with the step surface 44a of the turbine housing 4. The base surface 51 may be provided as a seating surface, so that the attachment state (posture) of the cover member 50 is stable.

The cover member 50 having the second end surface P2 open toward the second nozzle ring 32 can be reduced in weight. Namely, the cover member 50 having a cup shape having a hollow inside may contribute to a reduction in overall weight of the turbocharger.

Since the cover member 50 may include the base surface 51 as a seating surface and the inclined surface portion 53 facing the scroll flow path 16, the shape of the inclined surface portion 53 can be changed to arbitrarily adjust the shape of the scroll flow path 16.

Since the cover member 50 may have a symmetrical shape, the cover member 50 can be easily produced. In addition, since there is no step between the turbine housing 4 and the cover member 50 in a portion in the circumferential direction D3, the gas flows smoothly.

Since the inner tubular portion 52 of the cover member 50 may be fitted to the second outer peripheral surface 46b of the cylindrical portion 46, the attachment state (posture) of the cover member 50 can be further stable.

It is to be understood that not all aspects, advantages and features described herein may necessarily be achieved by, or included in, any one particular example. Indeed, having described and illustrated various examples herein, it should be apparent that other examples may be modified in arrangement and detail. For example, the outer diameter of the base surface 51 of the cover member 50 (position of the outer peripheral edge 51a) may change in the circumferential direction D3. Namely, the base surface 51 may not have a symmetrical shape. In that case, the outer diameter of the base surface 51 of the cover member 50 may be equal to that of the first outer peripheral surface 44b of the tubular portion 44 of the turbine housing 4 in substantially the entire region in the circumferential direction D3. The inclined surface portion 53 of the cover member 50 may be smoothly continuous with the first outer peripheral surface 44b of the tubular portion 44 without a step in substantially the entire region in the circumferential direction D3, the first outer peripheral surface 44b forming a part of the scroll flow path 16 (another part formed by the turbine housing 4). In this case, since there is no step between the turbine housing 4 and the cover member 50 in substantially the entire region in the circumferential direction D3, the gas flows smoothly.

The outer diameter of the base surface 51 of the cover member 50 (position of the outer peripheral edge 51a) may not be equal to that of the first outer peripheral surface 44b of the tubular portion 44 of the turbine housing 4 in substantially the entire region in the circumferential direction D3. Namely, in substantially the entire region in the circumferential direction D3, the outer peripheral edge 51a of the base surface 51 may protrude outward from the first outer peripheral surface 44b in the radial direction D2 or may be retracted inward from the first outer peripheral surface 44*b* in the radial direction D2.

One or a plurality of hole portions may be formed in the base surface 51 or the inclined surface portion 53 of the cover member 50. The cover member 50 is not intended to seal a fluid. For example, a plurality of hole portions having a diameter of approximately 2 to 3 mm may be formed in the cover member 50. The size of the hole portion in this case may be, for example, two or more times the plate thickness, or may be ⅓ or less of the length in the radial direction D2 of the inclined surface portion 53.

The inner tubular portion 52 of the cover member 50 may not be press-fitted to the cylindrical portion 46. The inner tubular portion 52 or the like of the cover member 50 may be attached to the cylindrical portion 46 by snap fitting. A part of the inner tubular portion 52 or the base surface 51 of the cover member 50 may be welded to the turbine housing 4. The cover member 50 may be attached to the turbine housing 4 by electromagnetic forming which is a known technique. The structure that attaches the cover member 50 to the turbine housing 4 may be another structure. The inner tubular portion 52 may not be formed in the cover member 50.

The inclined surface portion 53 of the cover member 50 may have a configuration different from that of the inclined surface portion 53 of the example. The inclined surface portion 53 may be an inclined surface corresponding to a part of a conical surface. In that case, in a cross section corresponding to each of FIGS. 1, 2, and 7, the inclined surface portion 53 is not curved but linear. The inclined surface portion 53 may not be formed in the cover member 50.

The second end surface P2 of the cover member 50 may not be open. A wall portion may be provided on the second end surface P2 of the cover member 50. In addition, the base surface 51 may not be formed and the first end surface P1 of the cover member 50 may be open. The cover member 50 may be a single flat plate (annular disk). The thickness in the axial direction D1 of the gap S formed between the second end surface P2 of the cover member 50 and the second nozzle ring 32 may change in the circumferential direction D3 (may not be constant).

The base surface 51 of the cover member 50 may not be in contact with the step surface 44*a* of the tubular portion 44. The diameter of the outer peripheral end 56 of the cover member 50 may be larger than the diameter of the second nozzle ring 32, or may be smaller than the diameter of the second nozzle ring 32. Even when the diameter of the outer peripheral end 56 of the cover member 50 is larger than the diameter of the second nozzle ring 32, the outer peripheral end 56 of the cover member 50 is separated from the side surface of the second nozzle ring 32 (side surface that is located opposite the side surface facing the first nozzle ring 31) in the axial direction D1. The outer peripheral end 56 of the cover member 50 does not extend to a position facing an outer peripheral portion of the second nozzle ring 32 in the radial direction D2. The seal member 60 between the cover member 50 and the cylindrical portion 46 (second outer peripheral surface 46*b*) may have another shape that is not a C shape. The seal member may be omitted. When the seal member is omitted, a clearance is formed between the inner peripheral surface of the second nozzle ring 32 and the second outer peripheral surface 46*b* of the cylindrical portion 46.

In the example, a case where the cover member 50 has a sheet metal shape has been described; however, the present invention is not limited thereto. The cover member 50 may be, for example, a machined piece.

The boundary surface between the cover member 50 and the turbine housing 4 may be moved closer to an exhaust gas outlet flow path 10 side (namely, a side opposite the compressor 3) than in the example. In this case, the volume assumed by the cover member 50 is further increased, and the region of the turbine housing 4 is decreased. For example, the boundary surface may be located closer to an outlet side in the axial direction D1 than rear edges of the blades 6*b* of the turbine impeller 6. In other words, the majority (half or more) of the wall surface shape on an inner peripheral side of the scroll flow path 16 may be formed by the cover member 50. The cover member 50 is formed to a deeper position with respect to the turbine housing 4, so that the weight is further reduced.

We claim all modifications and variations coining within the spirit and scope of the subject matter claimed herein.

I claim:

1. A variable capacity turbocharger comprising:
a turbine impeller including a plurality of blades;
a turbine housing that accommodates the turbine impeller and includes a scroll flow path, a cylindrical portion having a shroud surface facing the blades of the turbine impeller, and an exhaust gas outlet flow path;
a variable capacity mechanism that is attached to the turbine housing and includes a first plate and a second plate facing each other, and a plurality of variable nozzle vanes disposed between the first plate and the second plate, the second plate being disposed closer to the exhaust gas outlet flow path than the first plate; and
a cover that is disposed outside the cylindrical portion in a radial direction of the turbine impeller to face the second plate in an axial direction of the turbine impeller and to form a part of the scroll flow path, the cover including an inner peripheral end disposed along the cylindrical portion of the turbine housing, an outer peripheral end disposed in the scroll flow path, and a hollow portion between the inner peripheral end and the outer peripheral end,
wherein the cover is attached to the turbine housing such that a gap is formed between the cover and the second plate, wherein the gap is open to the scroll flow path, and
wherein the hollow portion extends from the gap into the cover in the axial direction of the turbine impeller to allow exhaust gas in the scroll flow path to flow into the hollow portion of the cover via the gap.

2. The variable capacity turbocharger according to claim 1, wherein a diameter of the outer peripheral end of the cover is equal to or larger than a diameter of the second plate.

3. The variable capacity turbocharger according to claim 1,
wherein the turbine housing includes a tubular portion that is formed to be continuous with the cylindrical portion in the axial direction to form a second part of the scroll flow path on an outer peripheral side and to form the exhaust gas outlet flow path downstream of the turbine impeller on an inner peripheral side, and the tubular portion includes a step surface that has an annular shape and faces the second plate,
wherein the cover includes a base surface that has an annular shape and extends between the inner peripheral end and the outer peripheral end to form a first end surface in the axial direction and to be in contact with the step surface of the tubular portion, and wherein an outer diameter of the base surface of the cover is equal to a diameter of an outer periphery of the step surface of the tubular portion of the turbine housing in a circumferential direction of the turbine impeller.

4. The variable capacity turbocharger according to claim 3, wherein a second end surface of the cover is open toward the second plate, the second end surface being located opposite the base surface in the axial direction.

5. The variable capacity turbocharger according to claim 3,
wherein the outer diameter of the base surface of the cover is smaller than a diameter of the outer peripheral end of the cover, and
wherein the cover includes an inclined surface portion that is formed between the outer peripheral end and the base surface to face the scroll flow path.

6. The variable capacity turbocharger according to claim 5,
wherein the outer diameter of the base surface of the cover is constant in the circumferential direction of the turbine impeller, and is equal to the diameter of the outer periphery of the step surface of the tubular portion of the turbine housing in at least a portion of the base surface in the circumferential direction, and
wherein the inclined surface portion is smoothly continuous with an outer peripheral surface of the tubular portion in at least the portion of the base surface in the circumferential direction, the outer peripheral surface forming the second part of the scroll flow path.

7. The variable capacity turbocharger according to claim 5,
wherein the outer diameter of the base surface of the cover changes in the circumferential direction of the turbine impeller, and is equal to the diameter of the outer periphery of the step surface of the tubular portion of the turbine housing in substantially an entire region of the base surface in the circumferential direction, and
wherein the inclined surface portion is smoothly continuous with an outer peripheral surface of the tubular portion in substantially the entire region of the base surface in the circumferential direction, the outer peripheral surface forming the second part of the scroll flow path.

8. The variable capacity turbocharger according to claim 1, wherein the cover includes an inner tubular portion that is formed along the cylindrical portion of the turbine housing and has the inner peripheral end, and the inner tubular portion is fitted to an outer peripheral surface of the cylindrical portion, so that the cover is attached to the turbine housing.

9. The variable capacity turbocharger according to claim 1, wherein the gap extends radially between the outer peripheral end of the cover and the second plate.

10. The variable capacity turbocharger according to claim 1, wherein the cover has a concave shape that forms the hollow portion, wherein the concave shape is open toward the second plate.

11. A variable capacity turbocharger comprising:
a turbine impeller including a plurality of blades;
a turbine housing including a scroll flow path a cylindrical portion having a shroud surface facing the plurality of blades, a tubular portion that forms an exhaust gas outlet flow path downstream of the turbine impeller, and a step surface;
a variable capacity mechanism that is attached to the turbine housing so as to face the step surface; and
a cover that is disposed outside the cylindrical portion in a radial direction of the turbine impeller to face the variable capacity mechanism in an axial direction of the turbine impeller, the cover including an inner peripheral end disposed along the cylindrical portion of the turbine housing, an outer peripheral end disposed in the scroll flow path, and an annular-shaped base surface that contacts the step surface of the tubular portion,
wherein an outer diameter of the base surface of the cover is equal to a diameter of an outer periphery of the step surface of the tubular portion in a circumferential direction of the turbine impeller, and
wherein the outer peripheral end of the cover is spaced apart from the variable capacity mechanism by a gap to allow exhaust gas in the scroll flow path to flow into the gap.

12. The variable capacity turbocharger according to claim 11, wherein the cover has an end surface facing the variable capacity mechanism and forming the gap to extend in the radial direction between the end surface and the variable capacity mechanism.

13. The variable capacity turbocharger according to claim 11, wherein the cover has a concave shape that forms a hollow portion, wherein the concave shape of the cover is open toward the variable capacity mechanism to fluidly couple the hollow portion with the gap formed between the outer peripheral end of the cover and the variable capacity mechanism.

14. The variable capacity turbocharger according to claim 11, wherein the outer diameter of the base surface is smaller than a diameter of the outer peripheral end of the cover.

15. The variable capacity turbocharger according to claim 11,
wherein the cover includes an inclined surface portion that faces the scroll flow path and is located adjacent an outer peripheral surface of the tubular portion in the circumferential direction of the turbine impeller, the outer peripheral surface forming the scroll flow path, and
wherein the inclined surface portion includes a depression connected to an outer peripheral edge of the base surface, a protrusion connected to an outer peripheral edge of the inclined surface portion, and an inflection portion located between the depression and the protrusion.

16. The variable capacity turbocharger according to claim 11,
wherein the variable capacity mechanism includes a first plate and a second plate facing each other, the second plate located closer to the exhaust gas outlet flow path than the first plate, and
wherein the gap is formed between the cover and the second plate.

17. The variable capacity turbocharger according to claim 16, wherein a diameter of the outer peripheral end of the cover is equal to or larger than a diameter of the second plate.

18. A variable capacity turbocharger comprising:
a turbine impeller including a plurality of blades;
a turbine housing including a scroll flow path and a cylindrical portion having a shroud surface facing the plurality of blades;
a variable capacity mechanism that is attached to the turbine housing; and
a cover that is disposed outside the cylindrical portion in a radial direction of the turbine impeller to face the variable capacity mechanism in an axial direction of the turbine impeller, the cover including an inner peripheral end disposed along the cylindrical portion of the turbine housing and an outer peripheral end disposed in the scroll flow path, wherein the outer peripheral end of the cover forms a wall portion of the scroll flow path that extends at least in the axial direction of the turbine impeller, wherein the cover includes a hollow portion located radially inwardly from the outer peripheral end, and wherein the outer peripheral end of the cover forms an opening that fluidly couples the scroll flow path with the hollow portion to reduce a pressure difference on opposite sides of the wall portion.

19. The variable capacity turbocharger according to claim 18, wherein the cover extends in a concave shape from the outer peripheral end toward the inner peripheral end to form the hollow portion.

20. The variable capacity turbocharger according to claim 18, wherein the turbine housing includes a tubular portion that forms an exhaust gas outlet flow path downstream of the turbine impeller, the tubular portion including a step surface that faces the variable capacity mechanism, wherein the cover includes an annular-shaped base surface that contacts the step surface of the tubular portion, and wherein an outer diameter of the base surface is equal to a diameter of an outer periphery of the step surface of the tubular portion in a circumferential direction of the turbine impeller.

* * * * *